L. B. Walker,
Resawing Machine,
Nº 76,677. Patented Apr. 14, 1868.
Fig. 1.
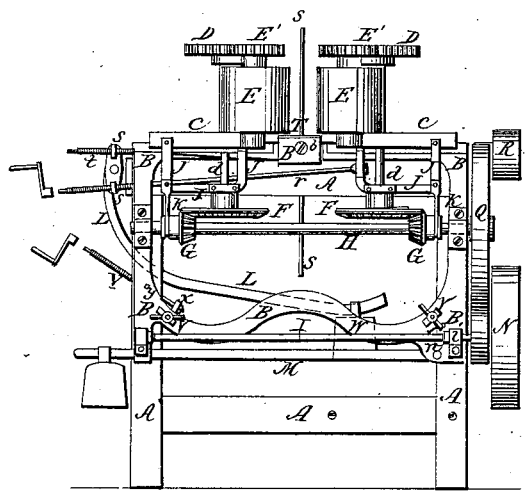
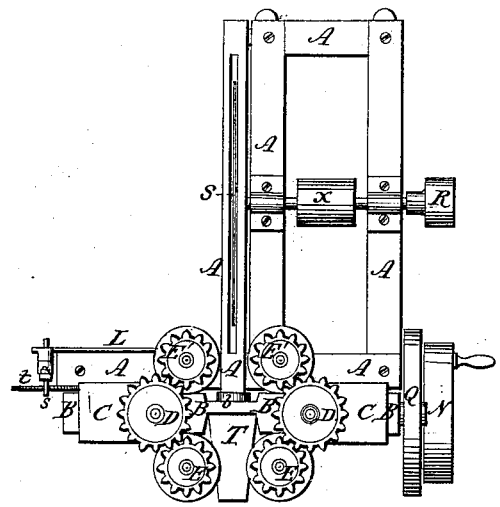
Fig. 2.
Witnesses:
L. L. Coburn
W. E. Mann
Inventor:
Loudus B Walker

United States Patent Office.

LONDUS B. WALKER, OF CHICAGO, ILLINOIS.

Letters Patent No. 76,677, dated April 14, 1868.

IMPROVEMENT IN SAW-MILLS.

The Schedule referred to in these Letters Patent and making part of the same.

TO ALL WHOM IT MAY CONCERN:

Be it known that I, LONDUS B. WALKER, of Chicago, in the county of Cook, and State of Illinois, have invented a new and useful Improvement in Resawing Machines; and I do hereby declare and make known that the following is a full, clear, and exact description of the same, reference being had to the accompanying drawings and the letters and figures marked thereon, which form part of this specification.

My said invention relates to that class of sawing-machines which are designed to saw siding or clapboards, or other thin stuff, from lumber which has previously been sawed in ordinary saw-mills, into pieces of proper size; and it consists in so pivoting or attaching the frame which contains the feed-bed and rollers to the permanent frame of the machine supporting the saw, that the lumber being sawed may be fed to the saw in such a position with reference to the saw as that the edges of the siding may be of different thicknesses, the saw passing through the pieces being resawed diagonally, as hereinafter more fully set forth.

To enable those skilled in the art to understand how to construct and use my invention. I will proceed to describe the same with particularity, making reference in so doing to the aforesaid drawings, in which—

Figure 1 represents a front elevation of my invention, and

Figure 2 is a plan or top view of the same.

Similar letters of reference in the different figures denote the same part of my said invention.

A represents any suitable frame, of iron or wood, supporting a horizontal shaft, upon which a circular saw, S, is fixed, and which is provided with a drum, X, whereby the power is applied to operate the saw, and also with a second drum, R, by means of which a belt, passing around a drum, N, upon a shaft, I, revolves the shaft H, and operates the feed, as hereinafter specified, said shaft H being revolved by means of the frictional gear-wheels P Q, the former being upon the shaft I, and the latter upon the shaft H, as shown in fig. 1.

B represents a vertical iron frame, arranged at the front of the main frame A, being pivoted thereto at $b$, in the centre or line of the saw S, so as to be susceptible of an independent oscillating movement upon its pivoted support at $b$.

A horizontal feed-table, T, projects from the said adjustable frame B, as seen in fig. 2, upon which the material to be resawed rests, as it is being fed to the saw by the action of the rollers E, as hereinafter described.

Upon the top of the said frame B are secured, in such a manner as to have a lateral sliding motion towards and from each other, two slides, marked C C, upon which are suitable supports or bearings for the journals of the aforesaid feed-rollers E, so that the said sliding movements of the slides C C will increase or diminish the space between each pair in front of the edge of the saw.

The upper ends of said rollers are provided with spur-wheels F, engaging with the gear-wheel D D, upon the vertical shafts $d\ d$, which have their bearings in the slides C C, and in certain frames J, thereunto attached, as shown in the drawings in fig. 1.

The said shafts $d\ d$ are provided with bevel-gear wheels F, engaging with corresponding wheels G upon the aforesaid shaft H, so that the revolution of said shaft H, as aforesaid, will revolve the feed-rollers E, said bevel-wheels G being provided with a feather, entering a longitudinal groove in the shaft, so as to revolve with the shaft, and still move longitudinally upon said shaft, by the action of the arms K K projecting down from the slides C C, as shown in fig. 1, so as to keep the wheels G F always in gear in all positions of the slides with respect to each other.

The pressure between the aforesaid friction-wheels P Q is regulated by moving the weight O upon the lever M, which is pivoted at $m$, and has its short arm attached to a movable box, $i$, through which the shaft I passes, as shown.

To one of said slides C, a rod, $r$, is secured, and to the other slide C is attached a similar rod, $t$, and $s\ s$ represent nuts, arranged upon said rods, which have screw-threads cut thereon.

To these nuts is attached, in any suitable manner, a bent lever, L, as shown, upon the end of which a weight, W, is suspended; and the tendency of this arrangement is to force the two pairs of rollers E towards each other, and thus produce the pressure upon the lumber to be resawed requisite to insure the same being passed or fed through the machine by the revolution of the said rollers E, as before described, while, by raising up said lever, the pressure is removed, and the space between the said rollers is enlarged to admit of pieces of different thickness being operated upon.

By revolving said rods $r\ t$, by means of a key or otherwise, the relative positions of the nuts $s\ s$ may be changed, so as to regulate the application of the pressure, as desired, which pressure may also be increased or diminished by varying the position of the weight W upon the lever.

It will be observed that all the shafts, gearing, and machinery, excepting the shaft of the saw, have their support upon and in the adjustable frame B, so that the turning or moving said frame does not disturb in the least the relation or operation thereof.

Y represents a rod passing through a stationary lug, $x$, upon the stationary frame A, so as to revolve freely, but to have no sliding movement in the same. This rod is formed as a screw upon the exterior, as shown, and passes through a nut at $y$, on the frame B, so that by turning said rod by means of a winch or otherwise, the pivoted frame B is swung out of the vertical position to one side, so that the faces of the rollers E are not parallel with the saw S; and when the desired angle is attained, the frame B may be securely fixed in position by tightening the set-screws V, which pass through slots in the pivoted frame, as shown in fig. 1.

The said frame B may be moved or adjusted, for the purposes described, by any other suitable device.

Having described the nature, construction, and operation of my invention, I will now specify what I claim, and desire to secure by Letters Patent.

1. I claim the frame B, pivoted as described, and constructed to sustain the feed-rollers and their driving-wheels, with slots and bolts, or their equivalents, to admit of the vibration of the frame, substantially in the manner and for the purposes specified.

2. I claim the slides C C, which carry the feed-rollers and gear-wheels, in combination with the lever L, rods $r$ and $t$, connecting-link and adjusting-nuts, all arranged and operating in the manner and for the purposes set forth and described.

LONDUS B. WALKER.

Witnesses:
W. E. MARRS,
L. L. COBURN.